(12) United States Patent
Hahn et al.

(10) Patent No.: US 9,404,993 B2
(45) Date of Patent: Aug. 2, 2016

(54) SYSTEM AND METHODS FOR INFORMATION COLLECTION AND PROCESSING FOR LOCATION ESTIMATION IN MIMO WIRELESS NETWORKS

(71) Applicant: Aruba Networks, Inc., Sunnyvale, CA (US)

(72) Inventors: Dongwoon Hahn, San Jose, CA (US); Subburajan Ponnuswamy, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/446,494

(22) Filed: Jul. 30, 2014

(65) Prior Publication Data

US 2016/0033613 A1    Feb. 4, 2016

(51) Int. Cl.
*H04B 7/02* (2006.01)
*G01S 3/72* (2006.01)
*H04B 7/04* (2006.01)
*H04B 7/06* (2006.01)

(52) U.S. Cl.
CPC ............... *G01S 3/72* (2013.01); *H04B 7/0417* (2013.01); *H04B 7/0452* (2013.01); *H04B 7/0617* (2013.01)

(58) Field of Classification Search
CPC .... H04B 7/0691; H04B 7/0874; H04B 7/061; H04B 7/0413; H04B 7/0617; H04B 7/0452; H04B 7/0417; H04B 7/024; H04B 7/0404; H04B 7/0408; H04B 7/0608; H04B 7/0695; H04B 7/04; H04B 7/088; H04B 7/068; H04B 7/0808; H04B 17/309; H04B 7/0602; H04B 7/0814; H04B 7/0318; H04B 7/0628; H04B 7/0697; H04B 7/0862; H04B 1/1027; H04B 7/0604; H04B 7/0613; H04B 7/0802; H04B 17/336; H04B 1/0483; H04B 7/082; H04B 1/44; H04B 7/026; H04B 7/08; H04B 7/0817; H04L 1/0026; H04L 2025/03426; H04L 1/0025; H04L 5/006; H04L 25/0206; H04L 27/2695; H04L 1/0606; H04L 1/0618; H04L 1/0031; H04L 5/0094; H04W 52/42; H04W 72/085; H04W 72/0453; H04W 72/1231; H04W 72/0446; H04W 52/241; H04W 72/046; H04W 72/082; H04J 11/0053
USPC ......... 375/267, 299, 260, 347; 455/101, 103, 455/132, 135, 500, 524, 102; 370/278, 339
See application file for complete search history.

(56) References Cited

U.S. PATENT DOCUMENTS

2006/0274847 A1* 12/2006 Molisch ................... H04B 7/02
                                                                    375/267
2010/0165872 A1*  7/2010 Jiang ................... H04L 43/0817
                                                                    370/253

(Continued)

*Primary Examiner* — Rahel Guarino
(74) *Attorney, Agent, or Firm* — Hewlett Packard Enterprise Patent Department

(57) ABSTRACT

Disclosed herein, one embodiment of the disclosure is directed to a system, apparatus, and method for location estimation in the presence of multipath/non-line-of-sight (NLOS) conditions. Various methods have been contemplated to detect the level of multipath/NLOS propagation between two devices. A SNR variation method determines how the SNR of each chain/stream is varying over a time window in order to detect the chain/stream with least local scattering or multipath. A measure of coherence SNR is defined to measure the level of multipath/NLOS per-chain/stream. Moreover, since per-subcarrier SNR information is available at the one or both nodes, the coherence methods can be used on a per-subcarrier basis to detect multipath/NLOS for the entire channel, for the specific spatial stream or for the specific frequencies occupied by the subcarriers. Furthermore, a coherence bandwidth estimation method uses the SNR variation over subcarriers to detect the coherence bandwidth of the spatial stream. The amount of multipath/NLOS is inversely proportional to the coherence bandwidth.

9 Claims, 8 Drawing Sheets

(56) References Cited

U.S. PATENT DOCUMENTS

2011/0199953 A1* 8/2011 Seok ............... H04W 74/0816
370/312

2014/0206414 A1* 7/2014 Oh ...................... H04B 7/0404
455/562.1

2015/0250003 A1* 9/2015 Seok .................... H04L 1/0008
370/329

* cited by examiner

SYSTEM AND METHODS FOR INFORMATION COLLECTION AND PROCESSING FOR LOCATION ESTIMATION IN MIMO WIRELESS NETWORKS

FIELD

Embodiments of the disclosure relate to wireless digital networks, and in particular, to a system and method for accurately and efficiently estimating locations of client devices in a multiple-input-multiple-output (MIMO) environment.

BACKGROUND

In an IEEE 802.11 wireless network, multiple-input-multiple-output (MIMO) devices use multiple chains for spatial multiplexing as well as advanced techniques such as transmit beamforming (TxBF) and multi-user MIMO (MU-MIMO) for increasing the reliability and performance of communication. In such a network, known location estimation methods use either the received signal strength indicator (RSSI)/signal-to-noise ratio (SNR) or time-based information (time of arrival "ToA", time difference of arrival "TDoA") for location estimation.

The presence of multiple chains and multi-stream rates makes it difficult to estimate an accurate RSSI. The RSSI/SNR can be measured per-chain, though typically an average, maximum, or minimum RSSI/SNR is reported to the application for location estimation. Each chain may receive the data stream through a different path (i.e., direct path vs. multipath). Even for single stream rates (i.e., management frames using legacy rates), all the received chains may be used to receive the frame and techniques such as maximal ratio combining (MRC) may be used to construct the single stream data. The result is that the RSSI/SNR measurements can be highly variable and can introduce significant error in location estimation.

Herein a device that shapes its transmitted frames is called a beamformer, and a receiver of such frames is called a beamformee. Advanced MIMO techniques such as TxBF and MU-MIMO require the beamformer and beamformee to frequently exchange information regarding the channel state.

BRIEF DESCRIPTION OF THE DRAWINGS

The disclosure may best be understood by referring to the following description and accompanying drawings that are used to illustrate embodiments of the disclosure by way of example and not limitation. In the drawings, in which like reference numerals indicate similar elements.

DETAILED DESCRIPTION

Figure 1:
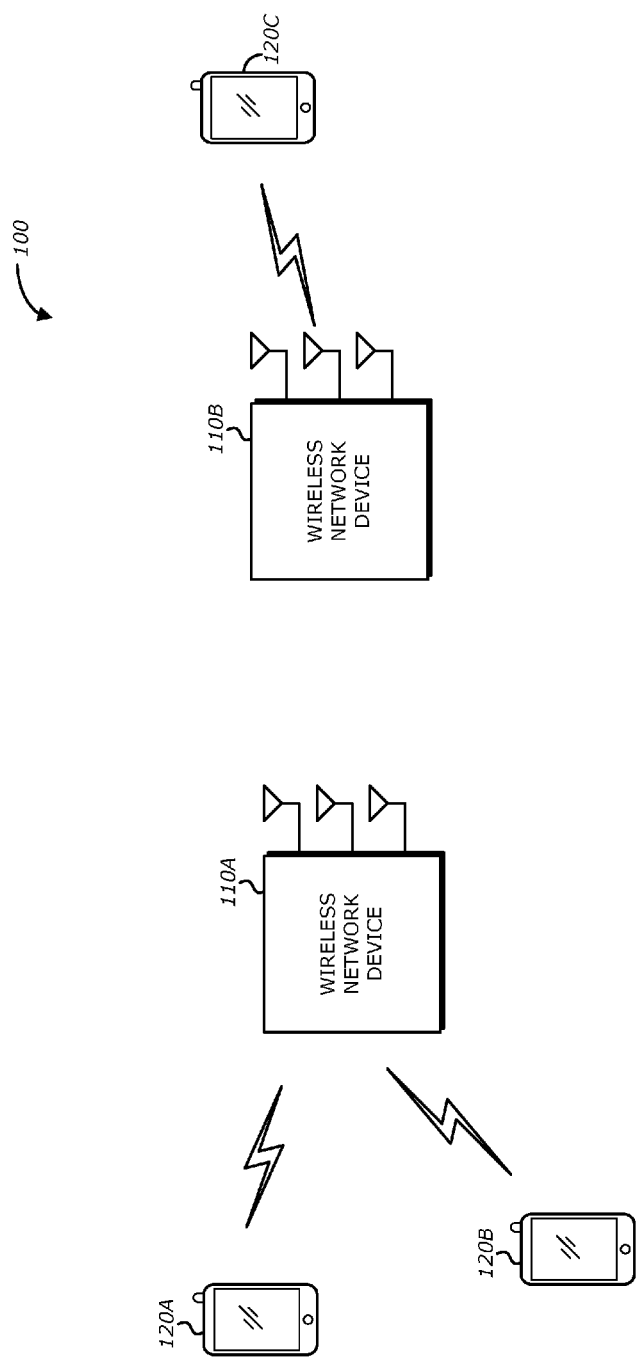
FIG. 1 illustrates an exemplary environment in which embodiments of the disclosure may be practiced.

In the following description, numerous specific details are set forth. However, it is understood that embodiments of the disclosure may be practiced without these specific details. In other instances, well-known circuits, structures and techniques have not been shown in detail in order not to obscure the understanding of this description.

Disclosed herein, one embodiment of the disclosure is directed to a system, apparatus, and method for determining path loss per radio frequency (RF) subcarrier. Path loss per RF subcarrier may be determined by obtaining from a first device feedback information, where the feedback information may correspond to at least one frame transmitted to the first device. Then, a plurality of received signal strength values may be derived for at least one frame as received at the first device based at least in part on the feedback information, where each received signal strength value of the plurality of received signal strength values may correspond to a respective RF subcarrier in a plurality of RF subcarriers. Next, an effective radiated power value corresponding to a particular RF subcarrier that was used for transmitting the at least one frame may be obtained for each particular RF subcarrier. Thereafter, a path loss value for the particular RF subcarrier may be obtained based on the received signal strength value corresponding to the particular RF subcarrier and the effective radiated power value corresponding to the particular RF subcarrier.

Disclosed herein, another embodiment of the disclosure is directed to a system, apparatus, and method for discarding unsuitable signal strength data. Unsuitable signal strength data may be discarded by first receiving a particular frame from a second device at each of a plurality of RF chains of a first device. A variance in received signal strength for the particular frame as received at each of the plurality of RF chains of the first device may be determined. Thereafter, the variance may be used to determine whether or not to use one or more attribute values for the particular frame as received at at least one of the plurality of RF chains for determining a distance between the first device and the second device or determining a location of the second device.

Disclosed herein, still another embodiment of the disclosure is directed to a system, apparatus, and method for selecting suitable received signal strength data. Suitable received signal strength data may be selected by receiving at each of a plurality of RF chains, a corresponding set of frames from a second device. Characteristics associated with the set of frames received at each particular RF chain of the plurality of RF chains may be determined. Next, a subset of RF chains from the plurality of RF chains may be selected based on the characteristics associated with the set of frames received at each particular RF chain of the plurality of RF chains. Thereafter, at least one particular operation may be performed using the characteristics associated with the set of frames received at the selected subset of RF chains without using the characteristics associated with the set of frames received at non-selected RF chains.

Disclosed herein, yet another embodiment of the disclosure is directed to a system, apparatus, and method for filtering data based on RF subcarriers. Data may be filtered per RF subcarrier by first receiving a set of one or more frames by a first device from a second device. Then, characteristics associated with the set of frames for each RF subcarrier of a plurality of RF subcarriers, on which the set of frames were detected, may be identified. Next, a subset of RF subcarriers may be selected based on the characteristics. Thereafter, a first subset of the characteristics associated with the subset of RF subcarriers may be identified.

Disclosed herein, a further embodiment of the disclosure is directed to a system, apparatus, and method for comparing RF signal fingerprints. RF signal fingerprints are compared by receiving a first set of one or more frames from a first device at a first location. Then, a received signal strength value associated with the first set of frames at each particular RF subcarrier of a plurality of RF subcarriers may be identified to obtain a first plurality of signal strength values. A second set of one or more frames may be received from a second device. A received signal strength value associated with the second set of frames at each particular RF subcarrier of a plurality of RF subcarriers may be identified to obtain a second plurality of signal strength values. Next, whether the first plurality of signal strength values and the second plurality of signal strength values share one or more similar derived characteristics may be determined. Thereafter, a location of the second device may be estimated as the first location responsive to a determination that the first plurality of signal strength values and the second plurality of signal strength values share one or more similar characteristics.

Disclosed herein, a further embodiment of the disclosure is directed to a system, apparatus, and method for comparing RF signal fingerprints. RF signal fingerprints are compared by receiving a first set of one or more frames from a first device at a first location. Then, a variability value relating to variability over time associated with the first set of frames at each particular radio frequency chain of a plurality of radio frequency chains may be identified to obtain a first plurality of variability values. A second set of one or more frames may be received from a second device. A variability value relating to variability over time associated with the second set of frames at each particular radio frequency chain of a plurality of radio frequency chains may be identified to obtain a second plurality of variability values. Then, a subset of the first plurality of variability values may be selected as a first subset of variability values based, at least in part, on one or more characteristics associated with the first set of frames, and a subset of the second plurality of variability values may be selected as a second subset of variability values based, at least in part, on one or more characteristics associated with the second set of frames. Next, whether the first subset of variability values and the second subset of variability values share one or more similar characteristics may be determined. Thereafter, a location of the second device may be estimated as the first location responsive to a determination that that the first plurality of variability values and the second plurality of variability values share one or more similar characteristics.

Of course, other features and advantages of the disclosure will be apparent from the accompanying drawings and from the detailed description that follows below.

In the following description, certain terminology is used to describe features of the disclosure. For example, in certain situations, the term "logic" is representative of hardware, firmware and/or software that is configured to perform one or more functions. As hardware, logic may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage. When executed by one or more processors, executable code may cause the one or more processors to perform operations according to the executable code.

A "frame" is a series of bits having a prescribed format. Examples of a frame may be a typical frame format as well as other variations such as an Asynchronous Transfer Mode "ATM" cell. Also, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

A subcarrier is a portion of the channel bandwidth used in orthogonal frequency-division multiplexing (OFDM)-based transmissions. The whole channel bandwidth is divided into smaller sub-channels or subcarriers. The number of subcarriers is typically a power of two, but some subcarriers may not be used to carry data (e.g., pilot, DC, or channel edge subcarriers). For example, an 80 MHz channel may be divided into 256 subcarriers of 312.5 kHz each.

FIG. 1 illustrates an exemplary environment 100 in which embodiments of the disclosure may be practiced. The exemplary wireless network devices 110 are MIMO-capable network device that provides data access service to one or more client devices 120 via wireless radio frequency (RF) transmissions. Wireless network devices 110 and client devices 120 may operate according to one or more versions of the IEEE 802.11 standards, such as the IEEE 802.11n and IEEE 802.11ac standards. Although two wireless network devices 110 and three client devices 120 are shown in FIG. 1, namely wireless network devices 110A-B and client devices 120A-C, environment 100 may include additional wireless network devices 110 and/or client devices 120. These additional devices, however, are omitted from FIG. 1 in order not to obscure the disclosure. Moreover, the association statuses of wireless network devices 110 and client devices 120 shown in FIG. 1 are illustrative only, and do not limit the disclosure in any way.

Figure 2:
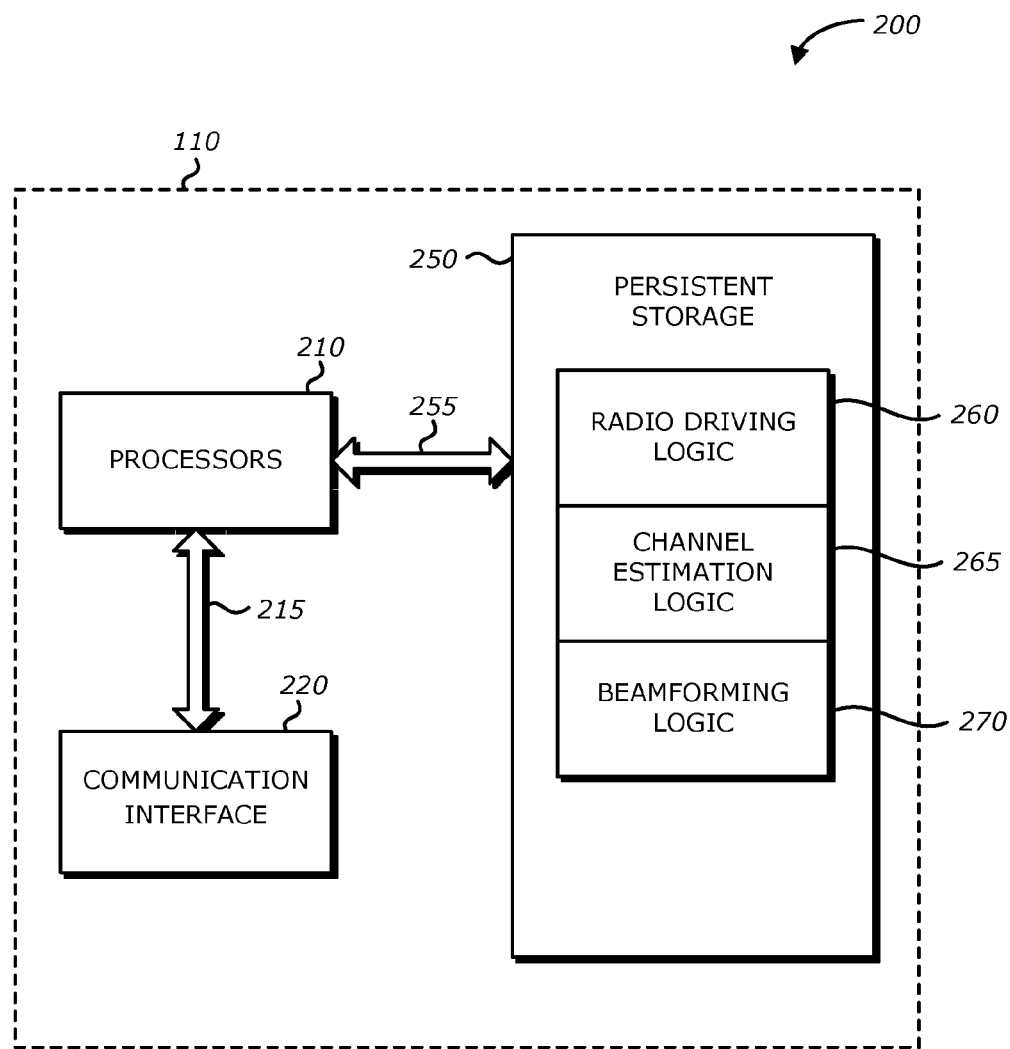
FIG. 2 is an exemplary block diagram of logic associated with a wireless network device.

Referring now to FIG. 2, an exemplary block diagram 200 of logic associated with wireless network device 110 is shown. The wireless network device 110 comprises one or more processors 210 which are coupled to communication interface logic 220 via a first transmission medium 215. Communication interface logic 220 enables communications with the data network (not shown), with client devices such as client devices 120 of FIG. 1, and possibly with an external controller (not shown). According to one embodiment of the disclosure, communication interface logic 220 may be implemented as one or more radio modules coupled to antennas for supporting wireless communications with other devices.

Additionally, communication interface logic 220 may be implemented as a physical interface including one or more ports for wired connectors.

The one or more processors 210 are further coupled to persistent storage 250 via transmission medium 255. According to one embodiment of the disclosure, persistent storage 250 may include radio driving logic 260, channel estimation logic 265, and/or beamforming logic 270 for the proper operation of wireless network device 110. Of course, when implemented as hardware, radio driving logic 260, channel estimation logic 265, and/or beamforming logic 270 would be implemented separately from persistent memory 250.

Embodiments of the disclosure may be used with a variety of location estimation methods, including those based on RSSI/SNR or time-based information (ToA, TDoA) as well as RF fingerprinting based methods. The embodiments can be used with the wireless network device 110 as well as the client device 120 to locate the position of any device (wireless network device 110 or client device 120) it is trying to locate. The terms "SNR" and "RSSI" are used interchangeably throughout this application, as one can be derived from the other when the actual or estimated noise floor is known.

Various methods have been contemplated to detect the level of multipath/non-line-of-sight (NLOS) propagation between two devices. A SNR variation method determines how the SNR of each chain/stream is varying over a time window in order to detect the chain/stream with least local scattering or multipath. A measure of coherence SNR is defined to measure the level of multipath/NLOS per-chain/stream. Moreover, since per-subcarrier SNR information is available at the one or both nodes, the coherence methods can be used on a per-subcarrier basis to detect multipath/NLOS for the entire channel, for the specific spatial stream or for the specific frequencies occupied by the subcarriers. Furthermore, a coherence bandwidth estimation method uses the SNR variation over subcarriers to detect the coherence bandwidth of the spatial stream. The amount of multipath/NLOS is inversely proportional to the coherence bandwidth.

The exact power profile of a frame (e.g., power transmitted out of the antenna for the entire frame as well as power per-subcarrier) transmitted from an IEEE 802.11 source may be accurately estimated based on the known OFDM profile information, the radio's transmit power, antenna gain and using a calibration method. When the received power information (per-frame or per-subcarrier) is obtained from the receiver, the exact path loss between the transmitter and the receiver may be calculated. Spatial streams, frames or subcarriers with high multipath/NLOS may be excluded from this calculation for accurate path loss with the multipath/NLOS detection methods. In another embodiment, instead of discarding spatial streams, frames or subcarriers with high multipath/NLOS outright, weighting may be used and these spatial streams, frames or subcarriers may be assigned a smaller weight.

In many location estimation algorithms, a set of "anchor" nodes that hear the nodes to be located need to be selected. For example, trilateration or triangulation requires a minimum of three nodes. A value of weight may be assigned to the quality of data from each anchor node based on the level of multipath/NLOS. The set of anchor nodes with the best value (least multipath/NLOS) can be selected for location estimation. Some anchor nodes may be discarded based on the level of multipath or if they are deemed to be in an area with high levels of NLOS from the perspective of client devices. In some embodiments, instead of discarding the anchor nodes outright, the weight can be used to derive a confidence level for the location estimate. For example, rather than discarding some anchor nodes under multipath/NLOS condition, all anchor nodes can be considered in some trilateration techniques, such as weighted least squares, by using the weight derived from multipath/NLOS determination. It should be appreciated that weighting instead of discarding the nodes may be preferable when not many anchor nodes are available.

The quality of SNR/RSSI or time-based information may vary over time for a specific node due to multipath or NLOS based on the mobility of the clients. Based on the multipath/NLOS detection methods, samples may be discarded or best frame(s), spatial stream(s) or subcarrier(s) can be selected to provide the information necessary for the location application.

In RF fingerprinting of IEEE 802.11 networks, RF measurements are collected at known and fixed locations. During the offline phase, the features are extracted from RF measurements and tagged with the location ID and AP ID in a map representing the area, such as a building map or campus map, such that RF features and physical locations are associated. During the online phase, the location is determined by comparing the RF features extracted from online measurements with the RF fingerprinting information. RSSI or SNR is widely used in creating the feature vectors, though time-based information (e.g., ToA, TDoA), angle-of-arrival (AoA), and/or other information may also be used for fingerprinting and subsequent location estimation. The location accuracy associated with the RF fingerprinting technique may be improved by multipath/NLOS detection and/or selecting the best frame or subcarrier for location estimation. For example, the measure (e.g., coherence bandwidth) calculated for NLOS/multipath detection can be used in composing the RF fingerprinting feature vectors. Smaller weight can be assigned to the features from the wireless network devices under less favorable channel condition (e.g., NLOS/multipath condition). It should be appreciated that the major source of errors in RF fingerprinting is the variation in the features. By selecting the best frame(s) or subcarrier(s) for location estimation, features can be extracted from the RF measurements with a smaller variation.

It is known that when there are more than one receiver chain, any IEEE 802.11 frame (single stream or multi-stream) will be received by all the receive chains. All chains can measure and record the signal strength per-chain, though the reported signal strength may be a filtered or a combined value. The radios can also accurately timestamp the data received on each chain separately. The time-stamping can occur at preamble start time or at OFDM symbol boundaries.

When the signal strength measurement is available for more than one chain, the variability in signal strength across chains for packets within a small time window (so as to take mobility into account) can be used to select/discard or weight the radio nodes. The variability across the RF chains may also be used to detect the chain that received the frame/spatial stream through the most direct path. Even when the radio node is not an intended recipient of TxBF or MU-MIMO transmission, it may be capable of estimating the SNR per subcarrier.

According to the IEEE 802.11 standards, when a wireless network device or a client device is part of TxBF or MU-MIMO, one of them (beamformee or beamformer) is responsible for estimating the channel. In explicit TxBF and MU-MIMO, the beamformee is responsible for providing the channel feedback information to the beamformer. The beamformee calculates or estimates the predicted SNR per subcarrier in the sounding frame. The SNR may not be available for every subcarrier, as some subcarriers such as those on the edge of the channel, DC subcarriers and pilot subcarriers may be omitted. In addition, the implementation-specific constraints may require that receiver to perform the SNR estimates for only a subset of the subcarriers (e.g., every $n^{th}$ subcarrier). The beamformee also calculates the average SNR of the frame, which is an arithmetic mean of the per-subcarrier SNRs. Depending on whether the beamformee is part of TxBF or MU-MIMO, the feedback information sent to the beamformer may only have the average SNR per-spatial stream or both the average SNR and SNRs per-subcarrier (encoded as delta SNR from the average SNR). In the case of implicit beamforming or beamforming to clients that do not support any form of standard beamforming (sometimes referred to as "legacy beamforming"), the beamformer performs channel estimation in the reverse direction. This channel estimation may involve estimating the SNR per-subcarrier. Finally, any 802.11 device can perform channel estimation and therefore SNR per-subcarrier estimation on any received frame and provide the same to the media access control (MAC) or other layers to be used in location and other applications. The location accuracy can be improved by using many combinations of above described scenarios, where the channel estimate or channel feedback is available.

Embodiments of the disclosure may be utilized under the following scenarios: 1) multi-chain reception: simple MIMO receiver with multiple chains, where frames are received through multiple chains, where only the per-chain RSSI/SNR and/or per-chain timestamp are available; 2) receiver channel estimate: the channel estimates available from any receiver have per-subcarrier SNR or RSSI for frames received from a specific client device. This information may be available on any receiver regardless of beamforming support or in case the beamformee supports implicit beamforming or legacy beamforming; 3) TxBF channel feedback: the beamformee sends periodic channel feedback to the beamformer upon reception of a sounding frame from the beamformer. The channel feedback consists of Givens rotations (per-subcarrier) and per-stream average SNR; and/or 4) MU-MIMO channel feedback: the MU-capable beamformee sends MU-MIMO channel feedback to the beamformer, which consists of both the per-stream average SNR and per-subcarrier delta SNR, in addition to other information related to the channel matrix. Though the 802.11ac standard defines only downlink MU-MIMO (e.g., from wireless network device 110 to client device 120), in the future uplink MU-MIMO may be supported.

In different embodiments, various methods have been contemplated to improve the accuracy of location estimation. In one embodiment, for each chain/spatial stream, a level of multipath/NLOS is detected using SNR variation over time. This method can be used when the per-chain SNR is available either at the receiver (e.g., multi-chain reception) or at the transmitter (e.g., the receiver sending the per-stream/chain SNR in the form of single-user or multi-user feedback). In the case of single-user or multi-user feedback, the transmitter (beamformer) has additional information about the frame, since it was the source of the frame that was used to measure the average SNR at the receiver (beamformee). Since the transmitter is capable of estimating the exact effective isotropic radiated power (EIRP), where this EIRP is the one at which the frame was transmitted (not the EIRP per-frame or per-radio), the exact loss in decibels (dB) between the source and the destination can be calculated. The SNR variation method determines how the SNR of each chain/stream is varying over time in order to detect the chain/stream with least local scattering or multipath.

For example, the chain/stream with the highest SNR (e.g., most likely the direct path) or lowest standard deviation or the least dB loss (path loss) can be used. Once the chain(s)/stream(s) with the least multipath are known, they can be used in location estimation along with the associated RSSI/SNR or timestamp. In the case of single-user and multi-user feedback, this information is used to calculate the exact loss in dB between the transmitter and receiver, which can be used for trilateration or multilateration. In other words, the space-time stream(s) that suffer the least from the NLOS/multipath can be chosen for location/range estimation. In addition, a measure of coherence of SNR over spatial streams may be used to estimate the level of multipath/NLOS.

In another embodiment, for each subcarrier, a level of multipath/NLOS is detected using SNR variation over time. While the SNR variation method (which uses the SNR per-frame or average SNR measured per-chain or per-stream) improves the location accuracy by detecting the level of multipath, the accuracy of location estimation can be further improved when per-subcarrier SNR is available, as in the MU-MIMO channel feedback. The transmitter is capable of estimating the actual EIRP per-subcarrier of the sounding frame it transmitted. When the beamformer receives the per-subcarrier SNR from the beamformee, it calculates the exact loss in dB for each subcarrier. The SNR variation algorithm is run on a per-subcarrier basis to determine the subcarrier with the least multipath. For example, the subcarrier with the lowest standard deviation or the lowest signal loss (indicating the most direct path) may be used to determine the level of multipath in some cases. The SNR loss of the selected subcarrier may be used by the location estimation algorithm to determine a distance.

In yet another embodiment, a level of multipath/NLOS is detected using the coherence bandwidth. The coherence bandwidth is a measure of the range of the frequency channels over which the channel is considered to be flat, namely, variation in amplitude less than a prescribed value. In other words, the coherence bandwidth is inversely proportional to the delay spread. The delay spread is directly proportional to the level of multipath. It is known that the higher the coherence bandwidth, the lower the impact of multipath is. The OFDM subcarrier bandwidth (e.g., 312.5 kHz) in IEEE 802.11 standards is designed to be smaller than the coherence bandwidth. When the delay spread is higher, the coherence bandwidth will be unacceptably low. The coherence bandwidth may be calculated from OFDM subcarrier information, thereby estimating the level of multipath, as will be described below. Based on the SNR variation over-subcarriers methods, the list of contiguous subcarriers with a fairly flat amplitude variation may be determined. The maximum level of variation to be considered as "flat" can be defined as a threshold or percentage. From these, the coherence bandwidth may be estimated, which is a multiple of OFDM subcarrier bandwidth (e.g., 312.5 kHz). The level of multipath is inversely proportional to this coherence bandwidth. The detected level of multipath is used in the location estimation, as will be described below. Table 1, which is reproduced from M. Carroll; T. A. Wysocki, *Delay Characteristics for an IEEE* 802.11*a Indoor Wireless Channel*, shows coherence bandwidth measurements from a real deployment of 802.11 OFDM system at various locations.

TABLE 1

| Sample coherence bandwidth measurements in 5 GHz | | | | |
|---|---|---|---|---|
| Pos. | Room | Hallway | Stairs | Theatre |
| A | 733.47 | 1319.40 | 321.71 | 842.90 |
| B | 628.75 | 781.51 | 317.41 | 285.71 |
| C | 775.12 | 570.88 | 337.15 | 444.79 |

TABLE 1-continued

Sample coherence bandwidth measurements in 5 GHz

| Pos. | Room | Hallway | Stairs | Theatre |
|------|---------|---------|---------|---------|
| D | 818.92 | 475.24 | 1034.60 | 1381.80 |
| E | 1554.10 | 398.36 | 566.65 | 247.56 |
| F | 829.14 | 485.74 | 374.43 | 306.92 |
| G | 514.94 | | 335.43 | 238.36 |
| H | 423.49 | | 473.30 | |
| I | 509.96 | | | |

In still another embodiment, the average EIRP and per-subcarrier EIRP at the transmitter may be estimated. It is known that a beamformer has the information necessary to accurately calculate the exact power (EIRP) of a frame it transmits. The power can be calculated per-frame or on a per-subcarrier basis. The transmitter knows the exact values of transmit power, antenna gain and any loss in the transmit path between the radio and the antenna. Based on the known signature of OFDM signals, the transmitter estimates the total power measured transmitted out of the antenna per-frame (typically measured at preamble time) and the per-FFT-bin power or per-subcarrier power. This can be done through one-time measurements and calibration at the transmitter by looping back the transmissions to the receiver path. The first two multipath detection methods described above that are based on SNR variation over chains/spatial streams and over subcarriers use this known information in estimating the exact loss between the transmitter and receiver.

In a further embodiment, anchor nodes may be selected based on a level of multipath/NLOS. When a level of multipath/NLOS is detected with any of the abovementioned methods, each node (e.g., a wireless network device 110 or a client device 120) may be assigned a value or weight that indicates the level of multipath/NLOS effect on that node. In location calculation, certain nodes are used as "anchor" nodes (e.g., wireless network devices 120 with known location coordinates). The multipath/NLOS weight can be used to select anchor nodes (if more than the minimum necessary nodes are available) or assign the confidence level (e.g., different confidence levels to different anchor nodes based on the multipath/NLOS level) to the information used in the location estimation algorithm (e.g., weighted least square method for trilateration).

The beamforming channel feedback can be helpful in location determination for both client devices 120 and wireless network devices 110. In the explicit beamforming, the beamformee measures and calculates the channel feedback information, and it is delivered to the beamformer. Thus, both the client device 120 and the wireless network device 110 have the channel feedback information in the explicit beamforming. In the single-user mode, only the beamformee has the SNR information per OFDM subcarrier. In MU-MIMO, the beamformer can obtain the delta SNR per OFDM subcarrier information from MU exclusive beamforming information. Thus, both the beamformer and the beamformee have the SNR per OFDM subcarrier information in MU-MIMO.

In implicit beamforming, the channel is evaluated by the beamformer upon receiving sounding frames from the beamformee. In the client/mobile device-based location determination, the client/mobile device has to be the beamformer. In the access point/network device-based location determination, the wireless network device has to be the beamformer.

The availability of the beamforming channel information differs by the role in the beamforming (e.g., beamformer or beamformee), and the type of beamforming. Location determination can benefit from whatever the beamforming channel feedback information is available.

Client beamforming channel feedback is useful in addition to the legacy radio resource measurements including IEEE 802.11k radio measurement reports (e.g., beacon report, frame report, etc.) for the location determination because some features such as SNR variation over subcarriers and coherence bandwidth can be extracted only by using the beamforming channel feedback while it is not available from existing radio resource measurements such as the IEEE 802.11k channel report.

It should be appreciated that no overhead over the air is incurred since the sounding frames and beamforming feedback are transmitted regardless of the support for the location determination.

Table 2, Table 3, and Table 4 are illustrative representatives that summarize the availability of each channel evaluation measurement by the beamforming type and the beamforming role.

TABLE 2

Availability of SNR per OFDM subcarrier and per Space-Time stream

| | Single User Explicit Beamforming | Single User Implicit Beamforming | Multi User Explicit Beamforming |
|---|---|---|---|
| Beamformer | NO | YES | YES |
| Beamformee | YES | NO | YES |

TABLE 3

Availability of Average SNR per Space-Time stream
(Arithmetic mean of SNR over OFDM subcarrier)

| | Single User Explicit Beamforming | Single User Implicit Beamforming | Multi User Explicit Beamforming |
|---|---|---|---|
| Beamformer | YES | YES | YES |
| Beamformee | YES | NO | YES |

TABLE 4

Availability of Channel Steering Matrix V

| | Single User Explicit Beamforming | Single User Implicit Beamforming | Multi User Explicit Beamforming |
|---|---|---|---|
| Beamformer | YES | YES | YES |
| Beamformee | YES | NO | YES |

Anchor Node Selection and Space-Time Stream Selection by Multipath/NLOS Detection In order to use multilateration or trilateration in the location determination, the range between nodes (in trilateration such as Time of Flight/Arrival) or the difference in range to two or more nodes (in multilateration such as Time Difference of Arrival) has to be estimated. At the presence of severe NLOS condition between nodes, the accuracy of range estimation may be affected by an error resulted from NLOS (positive bias in the case of time-based measurement). The mobility on the channel and the multipath may impair the accuracy of the range estimation, too. The range estimation can be done from the time-based measurements (e.g. Time of Flight) as well as the power measurements such as SNR or RSSI. In trilateration or multilateration, the locations of the anchor nodes are known, and, the location of the mobile node needs to be determined. In the wireless local area network, the anchor node is usually a wireless network device 110 with known location coordinates. However, the client devices 120 with known locations can be used as anchor nodes when the location of wireless network device 110 (for example, in rogue AP detection) has to be determined. The minimum number of anchor nodes that is needed to determine the location of a mobile node in the two dimensional space is three.

Since the mobile node may see more than three anchor nodes in a typical dense deployment, the anchor nodes in the severe multipath or NLOS conditions can be discarded in the trilateration or multilateration. Rather than completely discarding the anchor nodes in the multipath/NLOS condition, it is also possible to assign a weight for each anchor node based upon the severity of multipath/NLOS condition in the trilateration or the multilateration. In order to make a decision on which anchor to discard in the location determination or to calculate the weight, multipath/NLOS detection may be performed between each anchor node and the mobile node.

In this embodiment, a measure, $m_i$, corresponding to the severity of multipath/NLOS condition is calculated for each anchor node with index $i \in \{1, 2, \ldots, N_{anchor}\}$ ($N_{anchor}$ is the number of anchor nodes seen from the mobile node). $m_i$ is calculated in terms of two parameters, $\widehat{B_{c,i}}$ (the coherence bandwidth vector calculated for the channel between anchor node i and the mobile node) and $C_{STS,i}$ (a measure of coherence of SNR measurements over space time streams):

$$m_i = f(\widehat{B_{c,i}}, C_{STS,i})$$

where $\widehat{B_{c,i}}$ is the coherence bandwidth vector which is defined in terms of $B_{c,i,k}$ (the coherence bandwidth of SNR measurements in space time stream k):

$$\widehat{B_{c,i}} = [B_{c,i,0} \ldots B_{c,i,N_{STS,i}-1}]$$

where $N_{STS,i}$ is the number of space-time streams between the anchor node i and the mobile node.

The ranking of the fidelity of the SNR measurements over space-time streams is calculated from $\widehat{B_{c,i}}$. From $\widehat{B_{c,i}}$, the space-time stream, on which SNR is measured for the range estimation, can be selected. For example, the space-time stream k can be selected if $B_{C,i,k} \geq B_{C,i,m}$ where $m \in \{0, \ldots, N_{STS,i}-1\}$ and $m \neq k$.

Both $\widehat{B_{c,i}}$ and $C_{STS,i}$ are measures of the severity of multipath/NLOS between the target mobile node and the anchor node i, and they are calculated from the beamforming channel feedback or the measurements made to prepare for the beamforming channel feedback.

The coherence bandwidth can be approximated in terms of the delay spread. 50% coherence bandwidth can be approximated by $B_c = 1/(5 \ast \sigma_\tau)$ where "$\sigma_\tau$" is the multipath time delay spread. From the coherence bandwidth calculation, the severity of multipath can be estimated. In this embodiment, the coherence bandwidth is estimated from the SNRs or delta SNRs per OFDM subcarrier measurements, which can be found from the beamforming channel state information (CSI) channel feedback. The SNR vector for space-time stream k between anchor node i and the mobile node is denoted by $\widehat{SNR_{k,i}}$. $\widehat{SNR_{k,i}}$ is calculated from $SNR_{k,i,m}$, which is the SNR of space-time stream k between anchor node i and the mobile node on the subcarrier index m:

$$\widehat{SNR_{k,i}} = [SNR_{k,i,sscidx(0)} \ldots SNR_{k,i,sscidx(N_s-1)}]$$

where "$N_s$" is the number of OFDM subcarriers for which the average $SNR_{k,i,m}$ is calculated and sscidx( ) is a mapping from the index $\in \{0, \ldots, N_s-1\}$ to the OFDM subcarrier index. SNR is not calculated over every OFDM subcarrier (For example, no SNR is calculated for pilot subcarriers and the direct current "DC" subcarrier).

In MU-MIMO MU exclusive beamforming information, delta SNR per OFDM subcarrier is provided instead of SNR, which is the SNR value deviated by the average SNR of the space-time stream. It is denoted by $\Delta \widehat{\Delta SNR_k}$: :

$$\Delta \widehat{SNR_{k,i}} = [\Delta SNR_{k,i,sscidx(0)} \ldots \Delta SNR_{k,i,sscidx(N_s'-1)}]$$

where $N_s'$ is the number of OFDM subcarriers for which the $\Delta SNR_{k,i,m}$ is calculated.

Coherence bandwidth $B_{c,i,k}$ with regard to space-time stream k can be calculated from the $\widehat{SNR_{k,i}}$ or $\Delta \widehat{\Delta SNR_k}$: by finding out the range of subcarriers over which the SNR values are considered to be flat. The resolution of the calculated coherence bandwidth may be reduced on the beamformer side in the MU explicit beamforming when $\Delta \widehat{\Delta SNR_k}$: is used because, even with no grouping, the SNR is reported for every two subcarriers rather than for every subcarrier. In order to retain the resolution in the coherence bandwidth estimation and the extraction of other features, it is desirable to use all subcarrier information without grouping.

From $\widehat{B_{c,i}}$, a space-time stream (out of $N_{STS}$ space-time streams), referred to as "$STS_{best,i}$", on which SNR is measured for the range estimation, can be selected. The index of the space time stream, which suffers less from multipath/NLOS than other space-time streams, is calculated from $\widehat{B_{c,i}}$. This result can be used in calculating the SNR metric for the range estimation, as will be described below.

Next, the coherence of SNR measurements over space-time streams, $C_{STS,i}$, is measured. A large angular spread results from the scattering on the channel primarily due to the presence of multipath. A large angular spread implies the signals are coming from many different directions. As the angular spread increases, the degree of the space selective fading increases. Thus, by monitoring the SNR measurements for each space-time stream over the time, namely a coherence measure of SNR measurements over space-time streams between the anchor node i and the mobile node referred to as "$C_{STS,i}$" can be calculated:

$$C_{STS,i}(t,T) = g([MSN \widehat{R_{0,i}}(t,T)^T_{(t,T)}^T \ldots MSN \widehat{R_{N_{STS,i}-1,i}}_{(t,T)^T}])$$

where "g( )" is a function returning the coherence measure of SNR measurements over space time streams, "T" is the size of measurement window, "t" is the measurement sequence number when this measure is calculated, and MSN $\widehat{MSNR_{k,i}}$ (t,T) is [Mean($SNR_{k,i}(\widehat{t-T}T+1)) \ldots $ Mean(SN $\widehat{MSNR_{k,i}}$ (t))] where "Mean($\hat{x}$)" is the arithmetic mean of vector $\hat{x}$, and SN $\widehat{MSNR_{k,i}}$ (t') is the vector of SNR measurement, on the space time stream k per each OFDM subcarrier that is reported in the channel feedback, at the beamforming channel feedback iteration t'.

There are multiple ways to implement the g( ) which can measure the significance of coherence of SNR measurements over space-time streams. One way to implement g( ) is by calculating the variance of the mean SNR, calculated for each space-time stream over T window, over $N_{STS,i}$ space-time streams (g1 below). Also g( ) can be implemented by calculating the difference between the maximum mean SNR and minimum mean SNR over space-time streams (g2 below):

$$g_1([MSN \widehat{R_{0,\iota}}(t,T)^T{}_{(t,T)^T}\ldots MSN$$
$$\widehat{R_{N_{STS,\iota}-1,\iota}}{}_{(t,T)^T}])=\text{var}([\text{Mean}(MSN$$
$$\widehat{R_{0,\iota}}(t,T)^T{}_{(t,T)})\ldots \text{Mean}(MSN$$
$$\widehat{R_{N_{STS,\iota}-1,\iota}}{}_{(t,T)})])$$

$$g_2([MSN \widehat{R_{0,\iota}}(t,T)^T{}_{(t,T)^T}\ldots MSN$$
$$\widehat{R_{N_{STS,\iota}-1,\iota}}{}_{(t,T)^T}])=\max([\text{Mean}(MSN$$
$$\widehat{R_{0,\iota}}(t,T)^T{}_{(t,T)})\ldots \text{Mean}(MSN$$
$$\widehat{R_{N_{STS,\iota}-1,\iota}}{}_{(t,T)})])-\min([\text{Mean}(MSN$$
$$\widehat{R_{0,\iota}}(t,T)^T{}_{(t,T)})\ldots \text{Mean}(MSN$$
$$\widehat{R_{N_{STS,\iota}-1,\iota}}{}_{(t,T)})])$$

From $\widehat{B_{c,i}}$ and $C_{STS,i}$, two measures are calculated for each anchor node $i \in \{1,2,\ldots,N_{anchor}\}$: $m_i$ and $STS_{best,i}$. Given $m_i$, the anchor node under the severe multipath/NLOS condition can be discarded in the location determination. It is also feasible to assign a weight for each anchor node given $m_i$ in calculating the trilateration and the multilateration rather than discarding any of the anchor nodes. Given $STS_{best,i}$, the space-time stream, from which the SNR value is measured for the range estimation between the anchor node i and the mobile node, can be selected.

While anchor node selection and anchor node weight calculation was done by using SNRs in the beamforming channel feedback, the range estimation does not need to be done with the SNRs. After the anchor node selection and anchor node weight decision is done, the range can be estimated by a time-based measurement (e.g. Time of Flight) while it can be also estimated by a power-based measurement (e.g. RSSI).

Improved SNR Measurement Calculation

The power-related measure can be used in range estimation in the trilateration and the multilateration. It can be also used as a feature in the RF fingerprinting. Since the power-measure is affected by the variation over space and time due to fading at the presence of multipath/NLOS, it may be difficult to get a consistent reading of power-measure that can be used in the location determination. In this embodiment, a SNR measure is defined considering the multipath/NLOS condition given the beamforming channel feedback information.

In this embodiment, the multipath/NLOS detection decision is made for each OFDM subcarrier. Different from the average SNR reported in the beamforming channel feedback (which is an arithmetic mean of the SNR over reported subcarriers), a SNR measure is defined by discarding the SNR of the subcarriers which suffers from higher multipath/NLOS. This SNR measure defined for the location determination is denoted by LSNR, which will be described in detail below.

Multipath/NLOS detection is performed for each OFDM subcarrier in each space-time stream between the mobile node and the anchor node i. A known multipath/NLOS detection algorithm can be used. For instance, by calculating the variance of SNR over time, the multipath/NLOS condition for a particular OFDM subcarrier in a space-time stream can be detected. In this case, when the variance of SNRs of an OFDM subcarrier m over time is greater than a certain threshold value, the signals on the OFDM subcarrier m is determined to be under the influence of multipath/NLOS condition. The mean SNR of a space-time stream k then can be calculated discarding those OFDM subcarriers under the influence of multipath/NLOS condition.

The history of SNR vectors for OFDM subcarrier m in space-time stream k between anchor node i and the mobile node over the last T beamforming channel feedbacks is denoted by SNR $\widehat{SNR_{k,m,\iota}}$ (t,T):

$$\text{SNR } \widehat{SNR_{k,m,\iota}}(t,T)=[\text{SNR}_{k,m,i}(t-T+1)\ldots$$
$$\text{SNR}_{k,m,i}(t)]$$

where "$\text{SNR}_{k,m,i}(t')$" is the SNR on the OFDM subcarrier m in space-time stream k between anchor node i and the mobile node at the beamforming feedback iteration t'.

From SNR $\widehat{SNR_{k,m,\iota}}$ (t,T), the multipath/NLOS detection is performed as described above. The multipath/NLOS detection result for every OFDM subcarrier, considered in the beamforming channel feedback, is denoted by $H_{k,i}(t,T)$ which is a Boolean vector, representing the result of multipath/NLOS detection for the space-time stream k between the mobile node and the anchor node:

$$\widehat{H_{k,\iota}(t,T)}=[H_{k,i,sscidx(0)}(t,T)\ldots$$
$$H_{k,i,sscidx(N_s-1)}(t,T)]$$

where $H_{k,i,m}(t,T)$ is the result of multipath/NLOS detection with regard to subcarrier m. It is 0 when multipath/NLOS is detected and 1 when multipath/NLOS is not detected. The mean SNR on an OFDM subcarrier m in the space-time stream k over time T, calculated at beamforming channel feedback iteration t, is denoted by ASN$\widehat{R_{k,\iota,m}}$ (t,T):

$$\text{ASN}\widehat{R_{k,\iota,m}}(t,T)=[ASNR_{k,i,sscidx(0)}(t,T)\ldots$$
$$ASNR_{k,i,sscidx(N_s-1)}(t,T)]$$

The LSNR of space-time stream k can be defined as follows:

$$LSNR_{k,i}=ASN\widehat{R_{k,\iota,m}}(t,T).*\widehat{H_{k,\iota}(t,T)}/\text{Sum}($$
$$\widehat{H_{k,\iota}(t,T)}) \text{ if } Sum(H_{k,i}(t,T))>0$$

where the symbol ".*" is a piecewise multiplication operator between two vectors, and $\text{Sum}(\hat{x})$ is the sum of components in vector $\hat{x}$. If $\text{Sum}(\widehat{H_{k,\iota}(t,T)}))=0$, $LSNR_{k,i}$ is set to not a number (NaN) which indicates the mean SNR is calculated only with the signals over multipath/NLOS condition.

Figure 3:
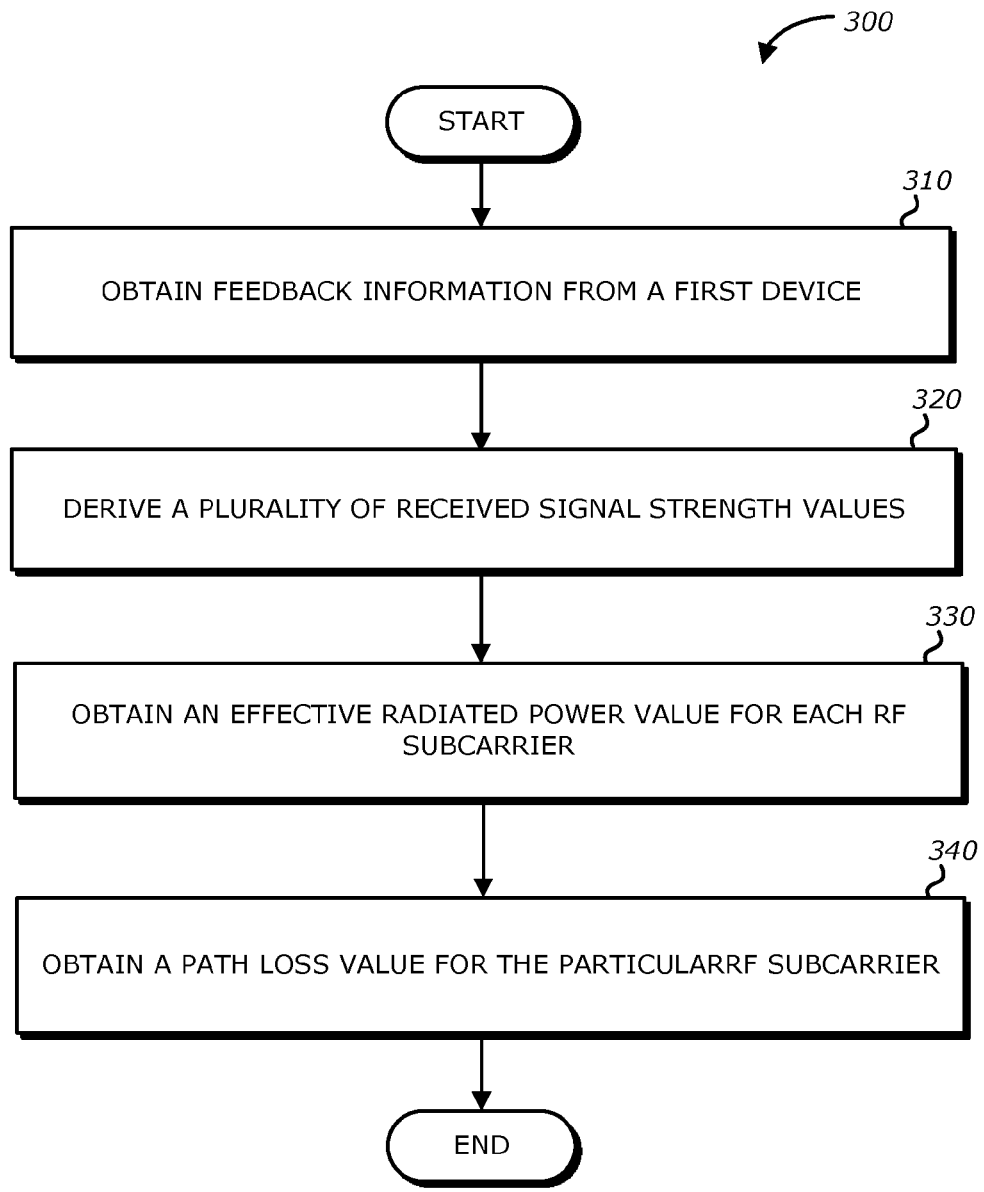
FIG. 3 is a flowchart illustrating an exemplary method for determining path loss per RF subcarrier.

Referring to FIG. 3, a flowchart illustrating an exemplary method 300 for determining path loss per RF subcarrier. At block 310, feedback information may be obtained from a first device, where the feedback information may correspond to at least one frame transmitted to the first device. The frame may be a sounding frame, and the first device may be a client device. At block 320, a plurality of received signal strength values may be derived for the at least one frame as received at the first device based at least in part on the feedback information, where each received signal strength value of the plurality of received signal strength values may correspond to a respective RF subcarrier in a plurality of RF subcarriers. The feedback information may comprise SNR per RF subcarrier in the plurality of RF subcarriers. Moreover, the plurality of signal strength values may be derived further based on a noise floor value detected by the first device. Next, at block 330, an effective radiated power value corresponding to a particular RF subcarrier that was used for transmitting the at least one frame may be obtained for each particular RF subcarrier. Thereafter, at block 340, a path loss value for the particular RF subcarrier may be obtained based on the received signal strength value corresponding to the particular RF subcarrier and the effective radiated power value corresponding to the particular RF subcarrier. The obtaining of the path loss value may comprise subtracting the received signal strength value corresponding to the particular RF subcarrier from the effective radiated power value corresponding to the particular RF subcarrier. Moreover, in one embodiment, a plurality of path loss values may be obtained, where each path loss value may correspond to a respective RF subcarrier of the plurality of RF subcarriers. In another embodiment, a subset of RF subcarriers may be selected. In a further embodiment, a largest set of consecutive RF subcarriers with similar path loss values may be identified, and a coherence bandwidth may be determined based on the largest set of consecutive radio frequency subcarriers with similar path loss values. Thereafter, a level of multipath conditions may be determined based on the coherence bandwidth, as described above.

Figure 4:
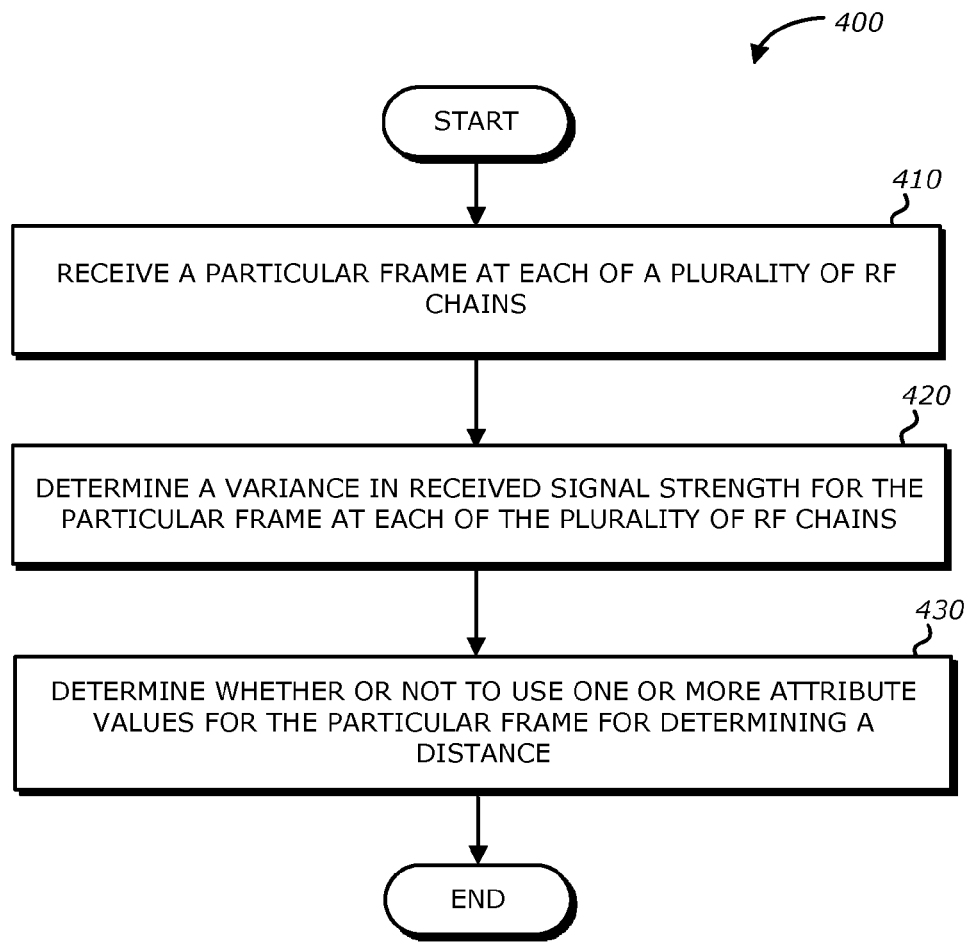
FIG. 4 is a flowchart illustrating an exemplary method for discarding unsuitable signal strength data.

Referring to FIG. 4, a flowchart illustrating an exemplary method 400 for discarding unsuitable signal strength data. At block 410, a particular frame from a second device may be received at each of a plurality of RF chains of a first device. Next, at block 420, a variance in received signal strength for the particular frame as received at each of the plurality of RF chains of the first device may be determined. Thereafter, at block 430, whether or not to use one or more attribute values for the particular frame as received at at least one of the plurality of RF chains for determining a distance between the first device and the second device or determining a location of the second device may be determined based at least in part on the variance. In one embodiment, attribute values for the particular frame as received at at least one of the plurality of RF chains are not used if the variance is above a particular threshold. In different embodiments, the one or more attribute values may be, for example, the received signal strength, or a time-based measurement, etc.

Figure 5:
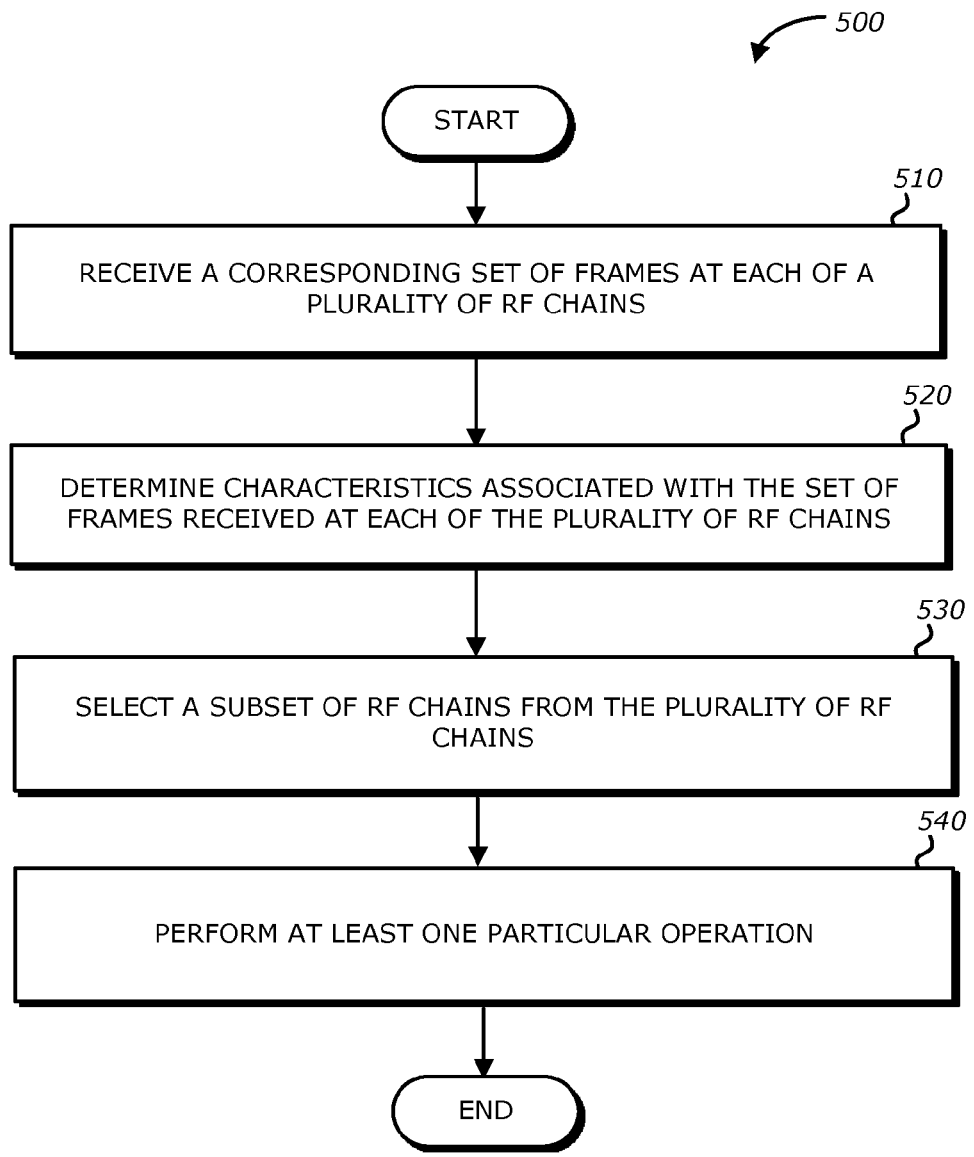
FIG. 5 is a flowchart illustrating an exemplary method for selecting suitable received signal strength data.

Referring to FIG. 5, a flowchart illustrating an exemplary method 500 for selecting suitable received signal strength data. At block 510, at each of a plurality of RF chains, a corresponding set of frames from a second device may be received. Next, at block 520, characteristics associated with the set of frames received at each particular RF chain of the plurality of RF chains may be determined. In one embodiment, the characteristics may correspond to a variance in received signal strength among frames in said set of frames. In another embodiment, the characteristics may correspond to a level of multipath determined for the set of frames received at the particular RF chain. In yet another embodiment, the characteristics may correspond to a line-of-sight value determined for the set of frames received at the particular RF chain. Next, at block 530, a subset of RF chains from the plurality of RF chains may be selected based on the characteristics associated with the set of frames received at each particular RF chain of the plurality of RF chains. In one embodiment, the subset of RF chains may comprise exactly one RF chain. Thereafter, at block 540, at least one particular operation may be performed using the characteristics associated with the set of frames received at the selected subset of RF chains without using the characteristics associated with the set of frames received at non-selected RF chains.

Figure 6:
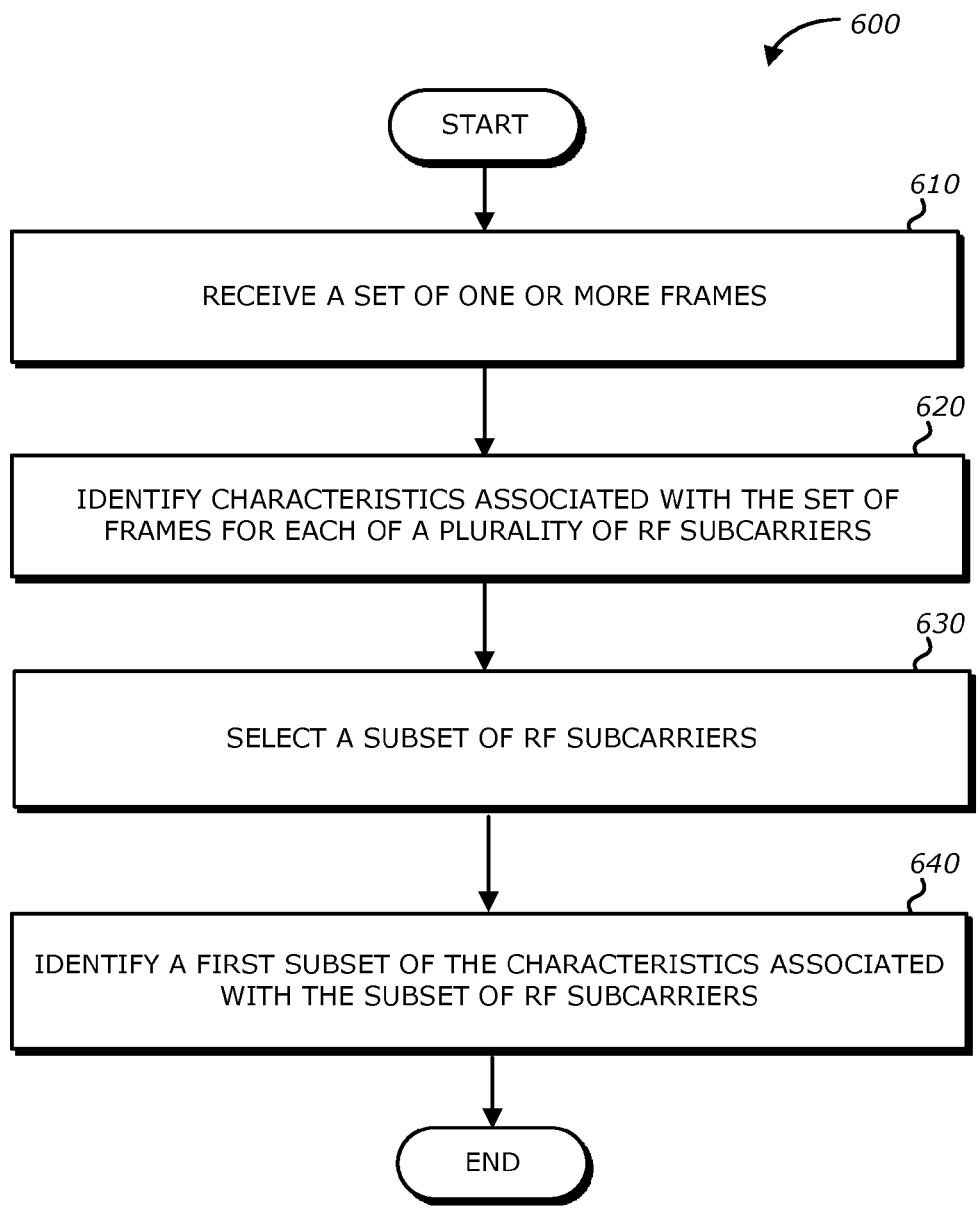
FIG. 6 is a flowchart illustrating an exemplary method for filtering data based on RF subcarriers.

Referring to FIG. 6, a flowchart illustrating an exemplary method 600 for filtering data based on RF subcarriers. At block 610, a set of one or more frames may be received by a first device from a second device. At block 620, characteristics associated with the set of frames for each RF subcarrier of a plurality of RF subcarriers, on which the set of frames were detected, may be identified. At block 630, a subset of RF subcarriers may be selected based on the characteristics. At block 640, a first subset of the characteristics associated with the subset of RF subcarriers may be identified. Thereafter, at least one operation using the first subset of characteristics may be performed without using a second subset of the characteristics. The operation may comprise determining a SNR for the received set of frames based on the signal strength detected for each of the first subset of RF subcarriers.

Figure 7:
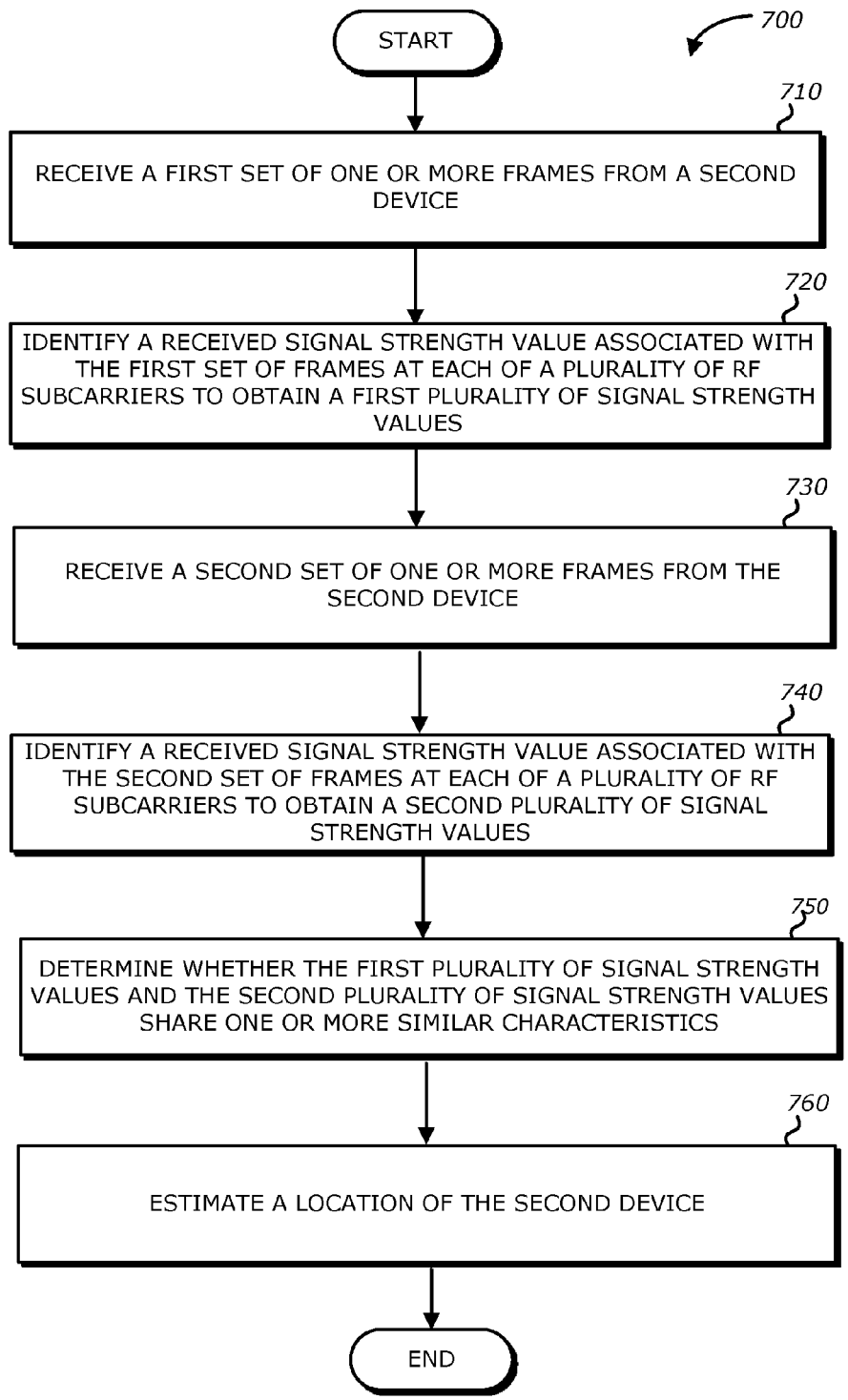
FIG. 7 is a flowchart illustrating an exemplary method for comparing RF signal fingerprints.

Referring to FIG. 7, a flowchart illustrating an exemplary method 700 for comparing RF signal fingerprints. At block 710, a first set of one or more frames may be received from a first device at a first location. At block 720, a received signal strength value associated with the first set of frames at each particular RF subcarrier of a plurality of RF subcarriers may be identified to obtain a first plurality of signal strength values. At block 730, a second set of one or more frames may be received from a second device. At block 740, a received signal strength value associated with the second set of frames at each particular RF subcarrier of a plurality of RF subcarriers may be identified to obtain a second plurality of signal strength values. At block 750, whether the first plurality of signal strength values and the second plurality of signal strength values share one or more similar derived characteristics may be determined. In one embodiment, the first plurality of signal strength values and the second plurality of signal strength values are determined to share one or more similar derived characteristics when a ratio of signal strength values across different RF subcarriers is similar. Thereafter, at block 760, a location of the second device may be estimated as the first location responsive to a determination that the first plurality of signal strength values and the second plurality of signal strength values share one or more similar characteristics.

Figure 8:
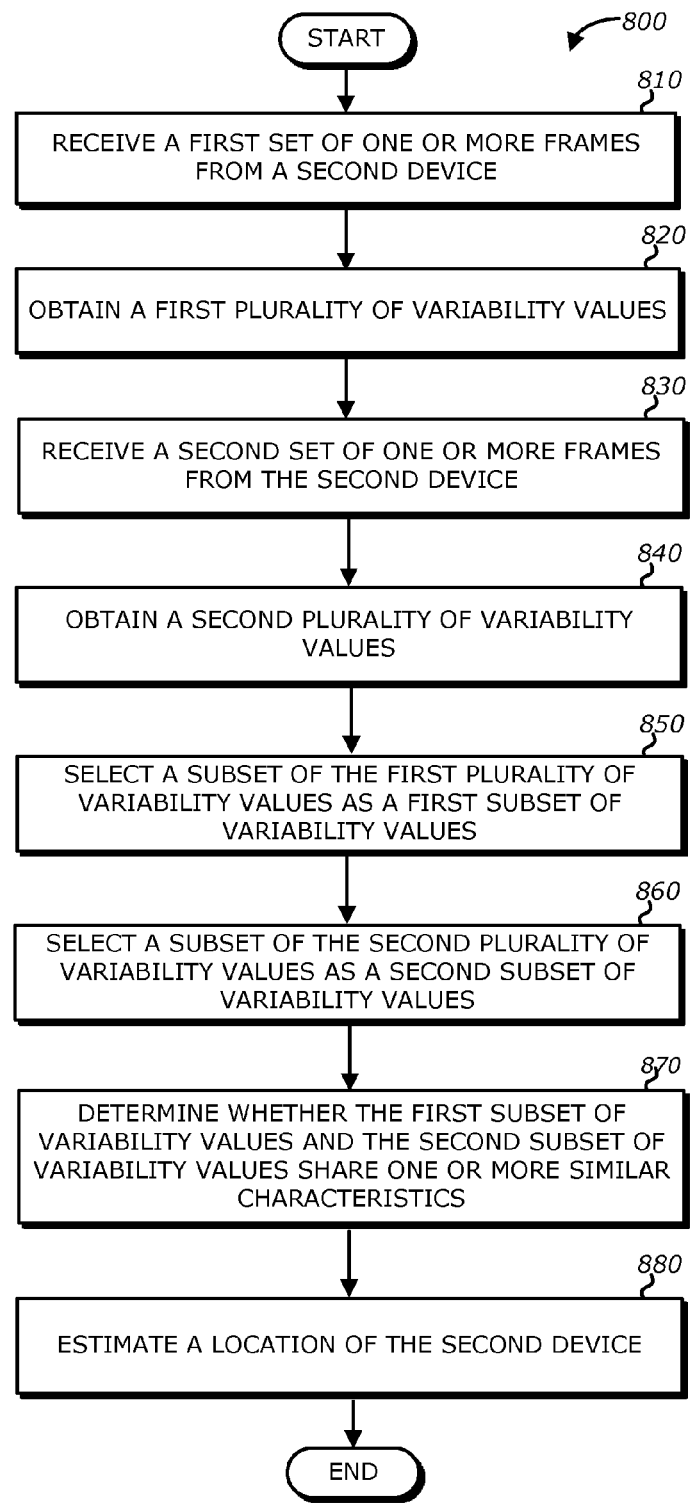
FIG. 8 is a flowchart illustrating an exemplary method for comparing RF signal fingerprints.

Referring to FIG. 8, a flowchart illustrating an exemplary method 800 for comparing RF signal fingerprints. At block 810, a first set of one or more frames may be received from a first device at a first location. At block 820, a variability value relating to variability over time associated with the first set of frames at each particular radio frequency chain of a plurality of radio frequency chains may be identified to obtain a first plurality of variability values. At block 830, a second set of one or more frames may be received from a second device. At block 840, a variability value relating to variability over time associated with the second set of frames at each particular radio frequency chain of a plurality of radio frequency chains may be identified to obtain a second plurality of variability values. At block 850, a subset of the first plurality of variability values may be selected as a first subset of variability values based, at least in part, on one or more characteristics associated with the first set of frames. At block 860, a subset of the second plurality of variability values may be selected as a second subset of variability values based, at least in part, on one or more characteristics associated with the second set of frames. In one embodiment, selecting the first and the second subset of variability values comprises selecting variability values associated with radio frequency chains that are associated with a similar signal strength level. At block 870, whether the first subset of variability values and the second subset of variability values share one or more similar characteristics may be determined. Thereafter, at block 880, a location of the second device may be estimated as the first location responsive to a determination that the first plurality of variability values and the second plurality of variability values share one or more similar characteristics.

Therefore, by utilizing embodiments of the disclosure, the accuracy of location estimation may be improved despite the presence of multipath/NLOS conditions. A level of multipath/NLOS may be detected.

While the invention has been described in terms of various embodiments, the invention should not be limited to only those embodiments described, but can be practiced with modification and alteration within the spirit and scope of the appended claims. The description is to be regarded as illustrative rather than limiting.

What is claimed is:

1. A non-transitory computer-readable medium comprising instructions which, when executed by one or more hardware processors of a first device, cause the one or more hardware processors to:
   receive, at each of a plurality of radio frequency chains, a corresponding set of frames from a second device;
   determine characteristics associated with the set of frames received at each particular radio frequency chain of the plurality of radio frequency chains;
   based on the characteristics associated with the set of frames received at each particular radio frequency chain of the plurality of radio frequency chains: select a subset of radio frequency chains from the plurality of radio frequency chains to be used in estimating a location of the second device; and
   estimate the location of the second device using the characteristics associated with the set of frames received at the selected subset of radio frequency chains without using the characteristics associated with the set of frames received at non-selected radio frequency chains.

2. The non-transitory computer-readable medium of claim 1, wherein the characteristics associated with the set of frames received at the particular radio frequency chain correspond to a variance in received signal strength among frames in said set of frames.

3. The non-transitory computer-readable medium of claim 1, wherein the characteristics associated with the set of frames received at the particular radio frequency chain correspond to a level of multipath determined for the set of frames received at the particular radio frequency chain.

4. The non-transitory computer-readable medium of claim 1, wherein the characteristics associated with the set of frames received at the particular radio frequency chain correspond to a Line-of-Sight value determined for the set of frames received at the particular radio frequency chain.

5. The non-transitory computer-readable medium of claim 1, wherein the subset of radio frequency chains comprises exactly one radio frequency chain.

6. A non-transitory computer-readable medium comprising instructions which, when executed by one or more hardware processors, cause the one or more hardware processors to:
   receive, by a first device from a second device, a set of one or more frames;
   identify characteristics associated with the set of frames for each radio frequency subcarrier, of a plurality of radio frequency subcarriers, on which the set of frames was detected;
   based on the characteristics, select a subset of the radio frequency subcarriers to be used in estimating a location of the second device;
   identify a first subset of the characteristics associated with the selected subset of radio frequency subcarriers; and
   estimate a location of the second device using the first subset of the characteristics without using a second subset of the characteristics.

7. The non-transitory computer-readable medium of claim 6, wherein the instructions are to cause the one or more hardware processors to determine a Signal-To-Noise ratio for the received set of frames based on a signal strength detected for each of the first subset of radio frequency subcarriers.

8. A non-transitory computer-readable medium comprising instructions which, when executed by one or more hardware processors, cause the one or more hardware processors to:
   receive, from a first device at a first location, a first set of one or more frames;
   identify a received signal strength value associated with the first set of frames at each particular radio frequency subcarrier of a plurality of radio frequency subcarriers to obtain a first plurality of signal strength values;
   receive, from a second device, a second set of one or more frames;
   identify a received signal strength value associated with the second set of frames at each particular radio frequency subcarrier of a plurality of radio frequency subcarriers to obtain a second plurality of signal strength values;
   determine that the first plurality of signal strength values and the second plurality of signal strength values share one or more similar derived characteristics; and
   responsive to a determination that the first plurality of signal strength values and the second plurality of signal strength values share one or more similar characteristics: estimate that a location of the second device is the first location.

9. The non-transitory computer-readable medium of claim 8, wherein to determine that the first plurality of signal strength values and the second plurality of signal strength values share one or more similar derived characteristics, the instructions are to cause the one or more hardware processors to determine that a ratio of signal strength values across different radio frequency subcarriers is similar.

* * * * *